United States Patent
Santana et al.

(10) Patent No.: US 11,172,700 B2
(45) Date of Patent: Nov. 16, 2021

(54) IMAGE-BASED ENCODING

(71) Applicant: INTERNATIONAL BUSINESS MACHINES CORPORATION, Armonk, NY (US)

(72) Inventors: Vagner Figueredo De Santana, São Paulo (BR); Priscilla Barreira Avegliano, Apto (BR); Carlos Henrique Cardonha, São Paulo (BR); Andrea Britto Mattos Lima, Sao Paulo (BR); Lucas Correia Villa Real, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 16/245,655

(22) Filed: Jan. 11, 2019

(65) Prior Publication Data
US 2020/0221754 A1   Jul. 16, 2020

(51) Int. Cl.
| | |
|---|---|
| *G06K 9/00* | (2006.01) |
| *A23P 20/20* | (2016.01) |
| *G06Q 30/06* | (2012.01) |
| *G06T 1/00* | (2006.01) |
| *G06F 16/9538* | (2019.01) |
| *A23P 20/25* | (2016.01) |

(52) U.S. Cl.
CPC .......... *A23P 20/20* (2016.08); *G06F 16/9538* (2019.01); *G06Q 30/0627* (2013.01); *G06T 1/0007* (2013.01); *A23P 2020/253* (2016.08)

(58) Field of Classification Search
CPC ................ A23P 20/20; A23P 2020/253; G06F 16/9538; G06Q 30/0627; G06T 1/0007
USPC ......................................................... 382/110
See application file for complete search history.

(56) References Cited

U.S. PATENT DOCUMENTS

| | | | | |
|---|---|---|---|---|
| 7,593,563 | B2* | 9/2009 | Wen | A21D 2/36 |
| | | | | 382/141 |
| 10,295,989 | B1* | 5/2019 | Nevins | B33Y 80/00 |
| 2006/0201432 | A1* | 9/2006 | Pratt | G06Q 50/02 |
| | | | | 119/51.02 |
| 2008/0032011 | A1 | 2/2008 | Liniger et al. | |
| 2011/0229606 | A1* | 9/2011 | Shaw | A63F 3/00 |
| | | | | 426/87 |
| 2014/0377437 | A1 | 12/2014 | Singleton | |
| 2015/0302375 | A1 | 10/2015 | Holman et al. | |
| 2016/0088870 | A1 | 3/2016 | Langeland et al. | |

(Continued)

OTHER PUBLICATIONS

Oregon Liquor Control Commission. "Packaging and Labeling Guide for Medical and Recreational Marijuana, Version 3.0." Portland, OR: 2017a.[Google Scholar] (2018). (Year: 2018).*

(Continued)

*Primary Examiner* — Jonathan S Lee
(74) *Attorney, Agent, or Firm* — Cantor Colburn LLP; Joseph Petrokaitis

(57) ABSTRACT

A technique relates to tracking a foodstuff. A device images human consumable code formed on the foodstuff, the human consumable code being part of the foodstuff, the foodstuff being unpackaged. A coding associated with the human consumable code is determined. Product information of the foodstuff is retrieved from a computer system by using the coding. The product information of the foodstuff is provided on the device.

20 Claims, 14 Drawing Sheets

(56) References Cited

U.S. PATENT DOCUMENTS

2016/0207679 A1* 7/2016 Jackson ............... G09F 3/0297
2017/0199168 A1* 7/2017 Jackson, Jr. ....... G01N 33/0098

OTHER PUBLICATIONS

Lim, C. et al., "Mobile Augmented Reality Based on Invisible Marker," 2016 IEEE International Symposium on Mixed and Augmented Reality Adjunct Proceedings, 4 pages.
Park, H. et al., Invisible Marker Based Augmented Reality System, 2005 Viksual Communications and Image Processing, Proc. of SPIE vol. 5960, 8 pages.

* cited by examiner

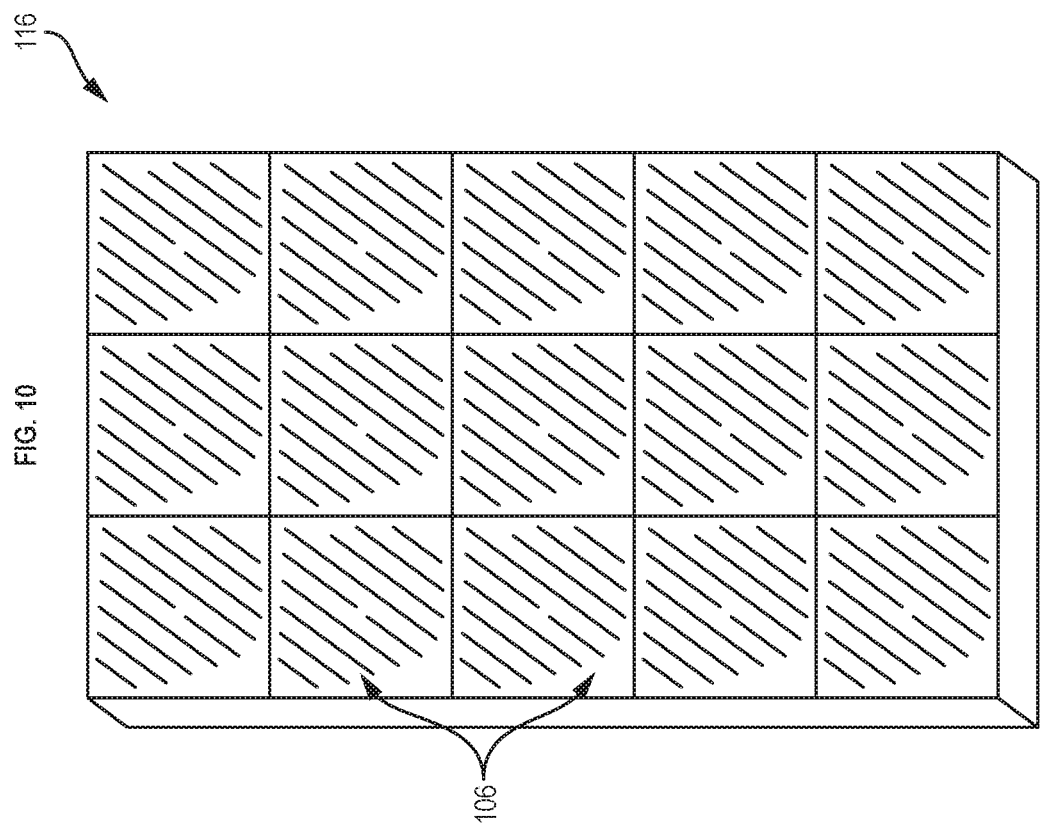

IMAGE-BASED ENCODING

BACKGROUND

The present invention generally relates to computer systems, and more specifically, to computer systems, computer-implemented methods, and computer program products configured to utilize image analysis for encoding items with embedded and human-imperceptible information.

A barcode (also bar code) is an optical, machine-readable, representation of data. The data usually describes something about the object that carries the barcode. Traditional barcodes systematically represent data by varying the widths and spacing of parallel lines and can be referred to as linear or one-dimensional (1D). Subsequently, two-dimensional (2D) variants were developed, using rectangles, dots, hexagons and other geometric patterns, called matrix codes or 2D barcodes, although they do not use bars as such. Initially, barcodes were only scanned by special optical scanners called barcode readers. Later, application software became available for devices such as smartphones with cameras that could read images.

The packaging of food products can include labels providing a list of ingredients so that a person eating the food is aware of its contents. There are cases in which some people have adverse reactions to one or more ingredients of the food. A food allergy is an abnormal immune response to food. The signs and symptoms can range from mild to severe. The symptoms typically occur within minutes to several hours of exposure. Food intolerance is a separate condition but is sometimes generalized as food allergies.

SUMMARY

Embodiments of the invention are directed to a computer-implemented method for tracking a foodstuff. A non-limiting example of the method includes imaging, by a device, an edible code formed on the foodstuff, the edible code being part of the foodstuff, the foodstuff being unpackaged, determining a coding associated with the edible code, retrieving product information of the foodstuff from a computer system by using the coding, and providing the product information of the foodstuff on the device.

Embodiments of the invention are directed to a system for tracking a foodstuff. A non-limiting example of the system includes a processor, and memory communicatively coupled to the processor, the memory including computer-executable instructions that, when executed by the processor, cause the processor to perform a method. A non-limiting example of the method includes imaging, by the processor, a edible code formed on the foodstuff, the edible code being part of the foodstuff, the foodstuff being unpackaged, determining a coding associated with the edible code, retrieving product information of the foodstuff from a computer system by using the coding, and providing the product information of the foodstuff.

Embodiments of the invention are directed to a computer program product for tracking a foodstuff, the computer program product comprising a computer readable storage medium having program instructions embodied therewith, where the computer readable storage medium is not a transitory signal per se, the program instructions executable by a computer to cause the computer to perform a method. A non-limiting example of the method includes imaging, by the computer, an edible code formed on the foodstuff, the edible code being part of the foodstuff, the foodstuff being unpackaged, determining a coding associated with the edible code, retrieving product information of the foodstuff from a computer system by using the coding, and providing the product information of the foodstuff on the computer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 10 depicts an example of printed codes on food pieces according to embodiments of the invention;

Figure 1:
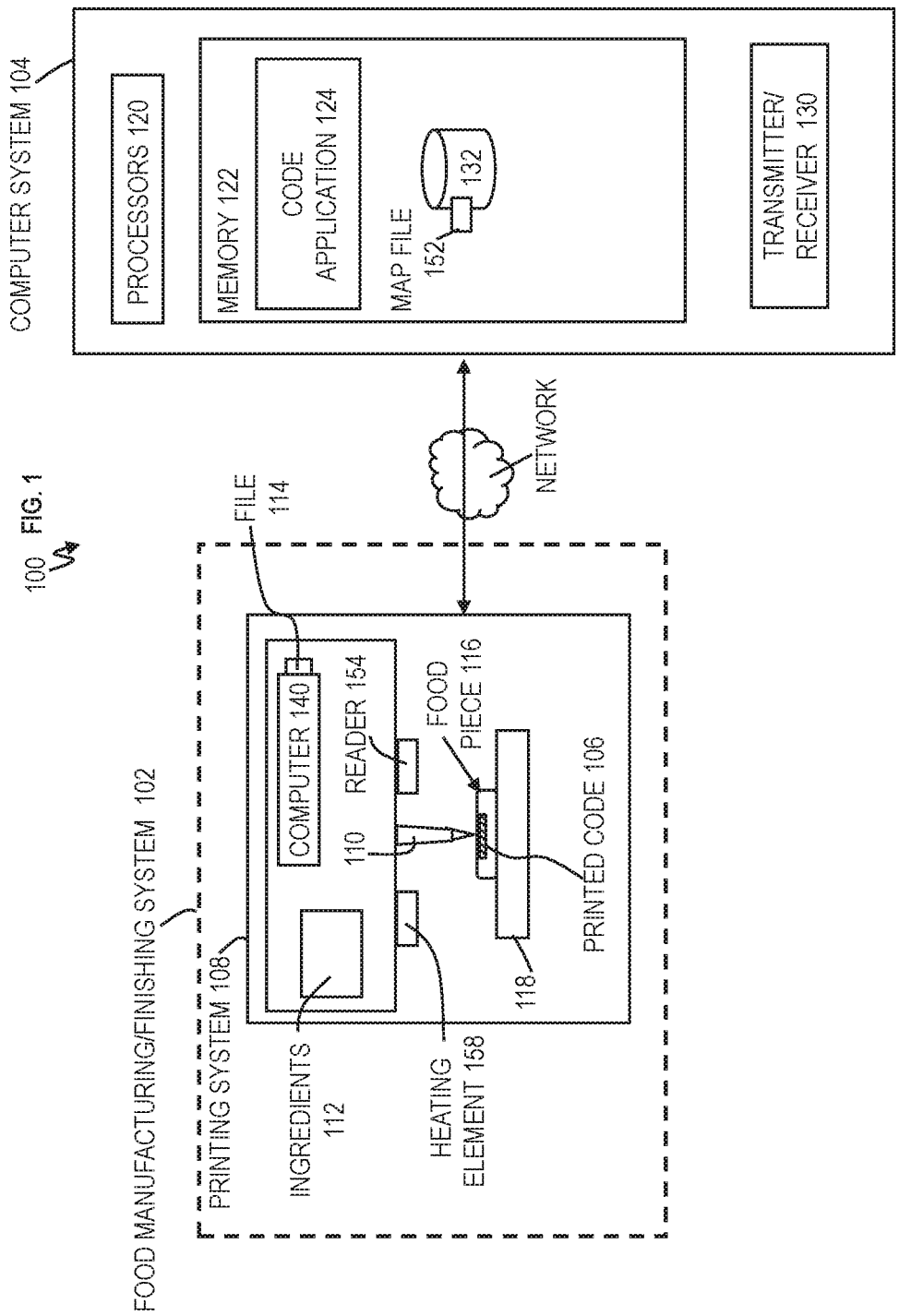
FIG. 1 depicts a system for tagging/encoding individual food pieces with embedded and human-imperceptible information according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Turning now to an overview of technologies that are more specifically relevant to aspects of the invention, tracking individual pieces of information from food products is important for multiple reasons, such as to identify origin, expiration date, nutrition facts, and/or ingredients. In particular, identifying the ingredients is important to people with dietary restrictions and food allergies. A number of approaches for identification already exist, for instance, bar code, quick response code (QR code), radio-frequency identification (RFID), and among others. However, these technologies are targeted at the identification of categories of products through the insertion of markers in their package or container. Consequently, the markers are extraneous to the food piece itself, thus preventing the identification of individual items when out of their packages.

Turning now to an overview of the aspects of the invention, one or more embodiments of the invention provide techniques for encoding individual food pieces with embedded and human-imperceptible information. Embodiments of the invention are configured to print a food product from scratch, using product components to add an information layer (i.e., identifier) and/or decorate an already made food product to code an identifier to each food piece. The identifier is not perceptible to the human eye and does not require the use of special inks that can harm the digestive system of the consumer. Currently, identifiers for packages do not allow tracking of individual items once the items are removed from the package. Embodiments of the invention utilize three-dimensional (3D) printing capabilities for producing or finishing food pieces and embedding information in a way that the food pieces can be easily tracked/scanned by end consumers using a mobile application all while being human-imperceptible.

Existing product codes are used in packages to identify a set of pieces, but not individual elements. Once products are outside the packing material, it is hard to track individual pieces. In accordance with embodiments of the invention, consumers can track and obtain information about food pieces even after they are unpacked, and the information can include expiration dates, nutrition facts, ingredients, etc. Producers of the food pieces can use tracking access data to identify where their products are consumed. Accordingly, embodiments of the invention are configured to print a code (identifier) that is machine readable, human imperceptible and that does not require additional devices/lens other than the ones present on current mobile phones.

Turning now to a more detailed description of aspects of the present invention, FIG. 1 depicts a system 100 for tagging/encoding individual food pieces with embedded and human-imperceptible information according to embodiments of the invention. A food manufacturing and/or finishing system 102 is depicted. The food manufacturing and/or finishing system 102 includes a food printing system 108 that is configured to print food items, such as food pieces 116, and/or to finish the food pieces 116. The food pieces 116 are edible pieces of food which are designed and fit for human consumption. The food printing system 108 is configured to print a code 106 (which is an identifier) on a surface of the food pieces 116 and/or embed the code 106 in a portion of the food pieces 116 such that the code is viewable by an electronic device. The printed code 106 is a physical edible structure on the surface of the food piece 116 and/or embedded in the food piece 116. The food pieces 116 are a food product, such as cookies, pastries, biscuits, crackers, pies, cakes, etc. The printed code 106 on each of the food pieces 116 is mapped (via map file 152) in one or more food product databases 132 to the food product information of the food product, i.e., the food pieces 116.

The food printing system 108 can be a 3D food printer. The food printer system 108 can print food, usually through one or more syringes/tubes/nozzles 110. 3D printing is any of various processes in which material is joined or solidified under computer control to create a three-dimensional object, with material being added together (such as liquid molecules or powder grains being fused together). The printed objects can be of almost any shape or geometry and typically are produced using digital model data from a 3D model or another electronic data source such as an additive manufacturing file (AMF) file (usually in sequential layers). There are many different technologies in 3D printing, such as stereolithography (SLA) or fused deposit modeling (FDM). Thus, unlike material removed from a stock in the conventional machining process, 3D printing or additive manufacturing builds a three-dimensional object from a computer-aided design (CAD) model or AMF file, usually by successively adding material layer by layer.

The food printing system 108 can include and/or be coupled to a computer 140 having a processor configured to execute computer-executable instructions. The computer 140 is configured to read a computer file 114 such as a CAD file, AMF file, etc., in order to print the desired food piece 116. The food printing system 108 includes various ingredient holders 112 (e.g., food cartridges, containers, etc.), and the computer 140 prints the ingredients at the correct location and time according to the computer file 114, thereby making the food piece 116 with the printed code 106. In some embodiments of the invention, the food piece 116 can be previously formed in a separate process, and the food printing system 108 reads the computer file 114 to print the code 106 of the food piece 116. The nozzle 110 and/or a tray/holder 118 are moveable in order to print the food piece 116 and/or the printed code 106. The food printing system 108 can include one or more heating elements 158 for heating the printed ingredients of the food piece 116 and/or printed code 106. The food printing system 108 can also include an electronic reader 154 configured to scan/read the printed code 106 as a quality control check, and the computer 140 is configured to check whether the printed code 106 matches a template of the printed code 106 in the computer file 114. The electronic reader can include a camera, imaging device, scanner, etc., for checking the printed code 106 and is coupled to the computer 140. The computer 140 includes one or more software applications that perform the check, and if there is not a match between the printed code 106 and the template of the code, the computer 140 is configured to reject that food piece 116. If there is a match between the printed code 106 and the template of the printed code in the file, the computer 140 (via the software application) is configured to pass the food piece 116.

The computer system 104 can couple to and communicate with the food manufacturing/finishing system 102 including the computer 140, and so forth. The computer system 104 and the computer 140 can communicate over a wired network, wireless network, and/or a combination of a wired and wireless network. The computer system 104 includes one or more processors 120 configured to execute computer executable-instructions in memory 122. The memory 122 can include or access code software application 124. The computer system 104 includes a transmitter/receiver 130 for communication. The computer system 104 can include and/or couple to a food product database 132.

Figure 2:
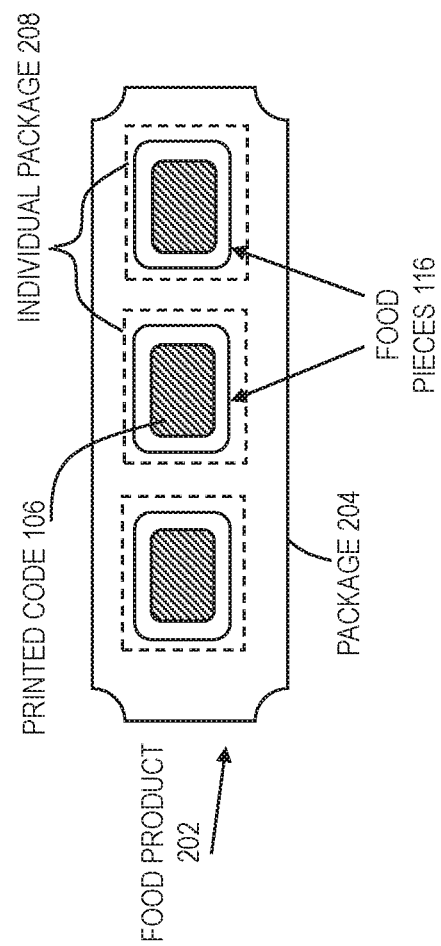
FIG. 2 depicts an example food product in a package according to embodiments of the invention.

The code application 124 is configured to map in a mapping file 152 the printed code 106 on the food pieces 116 to the food product information of the food product 202 depicted in FIG. 2. The code application 124 is configured store the design of the printed code 106, map file 152, and the food product information in a food product database 132. The food product database 132 stores the food product information for numerous different food products mapped (via the map file 152) to their respective printed codes 106. In some embodiments of the invention, one or more functions of the computer system 104 can be integrated in the computer 140.

FIG. 2 depicts an example food product 202 in a package 204 according to embodiments of the invention. Normally, the outer package 204 of a food product 202 will have a food label, barcode, tags, stickers, etc., all of which is not edible. Occasionally, the individual wrappers/packages 208 of food pieces 116 can have a label. However, the food pieces themselves do not have labels or barcodes indicating their ingredients, and such labels and barcodes might be unhealthy and detract from the food pieces. However, as discussed herein, the food pieces 116 have printed codes 106 which provide food product information (including food labels) even when the food pieces 116 are separated from their package 204 and individual package/wrapper 208.

Figure 3:
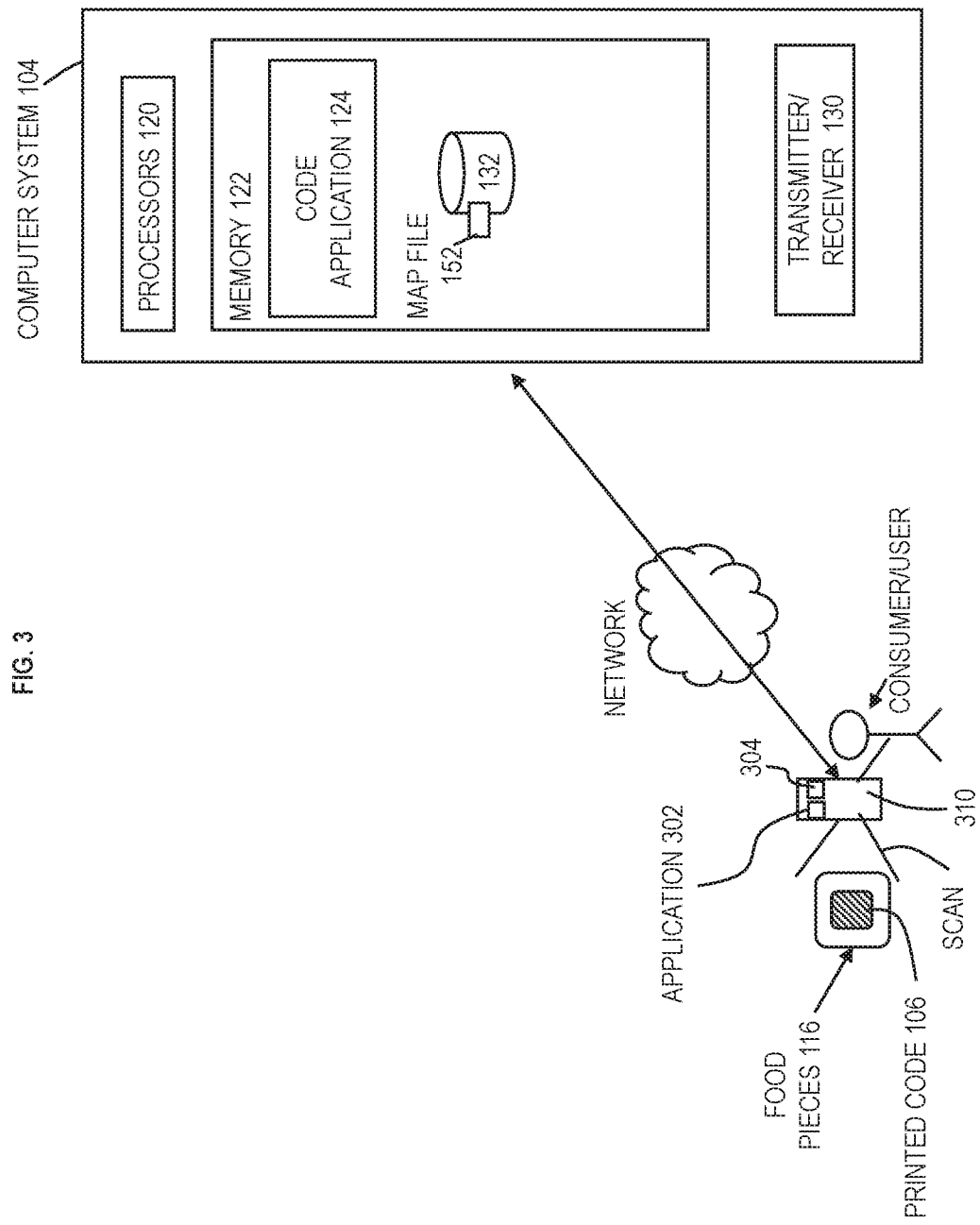
FIG. 3 depicts a diagram of a printed code providing food product information according to embodiments of the invention.
Figure 4:
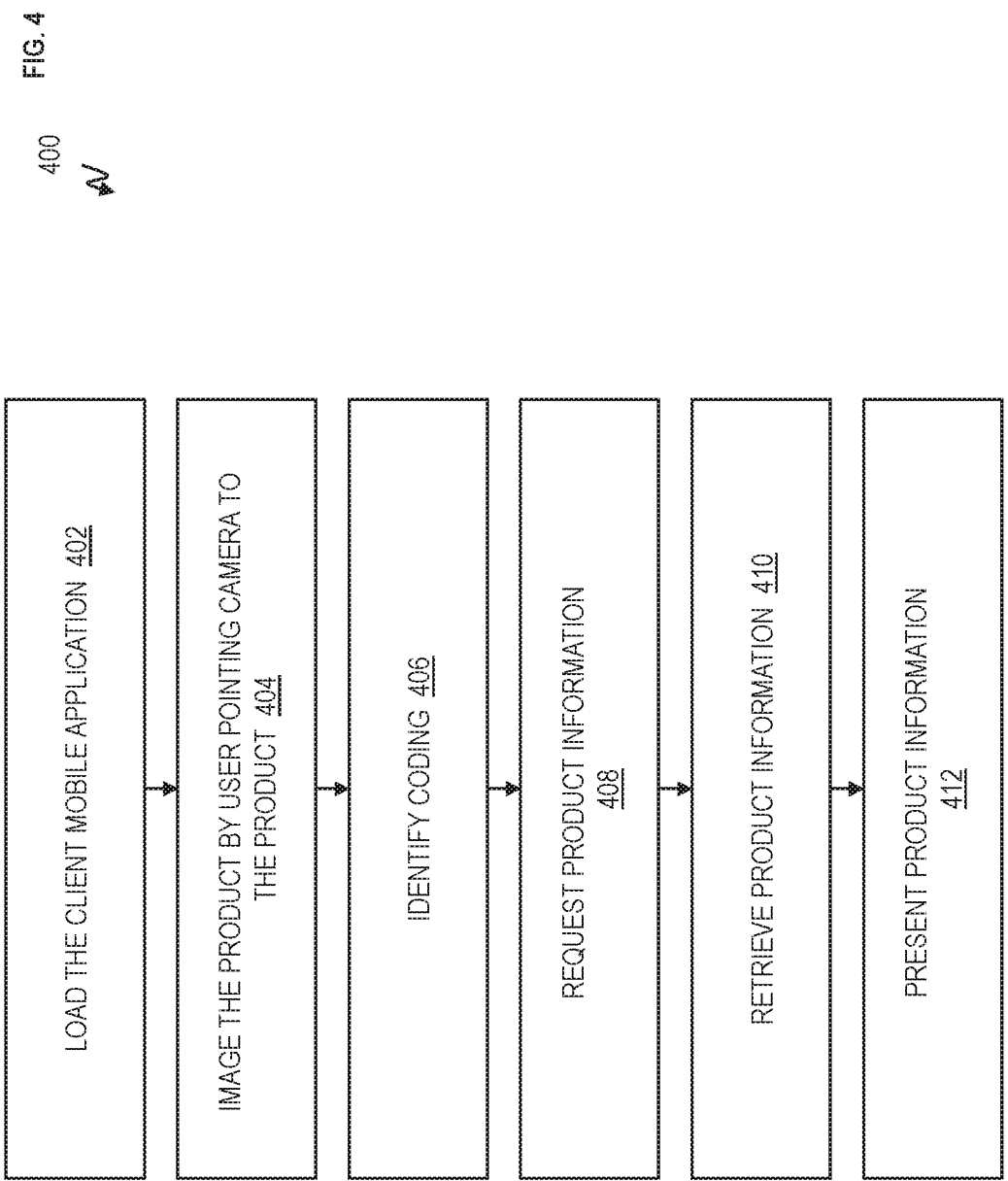
FIG. 4 depicts a flowchart of tracking a food piece according to embodiments of the invention.

As an example scenario, FIG. 3 depicts a diagram of the printed code 106 providing food product information according to embodiments of the invention. FIG. 4 depicts a flowchart 400 of tracking a food piece according to embodiments of the invention. A consumer might be preparing to eat the food pieces 116 and/or preparing to give the food pieces 116 to a friend, family member, and/or guest to eat. Because the food pieces 116 have been removed from their packages 205 and individual packages 208 (if used), the food labels are no longer present to read the product information such as ingredients, nutritional values, expiration date, etc.

At block 402, the consumer/user loads a client mobile application 302 on his/her device 310. The client mobile application 302 can be loaded in advance. According to embodiments of the invention, the consumer can use his/her device 310 to scan and/or take a picture of the printed code 106 on the food piece 116. The user already has an imaging application 304 with reading capability, and the imaging application 304 is analogous to camera applications that are already enabled with barcode and QR code reading capabilities. The device 310 can be a mobile device such as a smart phone with a camera or image reader, a computer, laptop, etc. The device 310 includes one or more processors, computer-executable instructions of software applications, transceiver/receiver, GPS device, etc.

At block 404, the consumer/user points the camera to the product, i.e., at the food piece 116, to capture an image of the product and/or scan the product. At block 406, the mobile application 302 is configured to identify coding by identifying the printed code 106 in the image. The mobile application 302 includes image recognition algorithms, which identify the shape of the template (i.e., the printed code 106) being used, and the mobile application 302 translates (or matches) this shape of the template to a predefined code associated with the printed code 106. As can be utilized by mobile application 302, several fiducial designs exist in the art, as well as image processing methods that can detect template (i.e., the printed code 106) robustly, in various rotations, illumination, scaling conditions, and occlusion conditions. Such methods can rely on edge detection and/or segmentation approaches and work in scenarios where size and contrast characteristics would be difficult human identification. Examples include, but are not limited to, Canny edge detector, Sobel operator/filter, and Laplacian filters, contour map, normalized cuts, and mean shift, which can be incorporated in and/or utilized by mobile application 302 as understood by one skilled in the art. The software application 302 preloads on the device 310 various codings/encodings can be matched to the image of the printed code 106.

At block 408, the mobile application 302 is configured to request food product information regarding the scanned printed code 106 of the food piece 116 from the computer system 104. After obtaining the image of the printed code 106, the mobile application 302 requests the information by using a code associated with that image to retrieve information, for example, on the web/Internet, from a remote server such as the computer system 104. For instance, the mobile application 302 can identify the coding associated with printed code 106 printed over the food piece 116 and add a prefix of a server that will retrieve information about the product from the food product database 132 of computer system 104. In some embodiments of the invention, the mobile application 302 is preconfigured with a predefined URL (e.g., http://foodproductinformation/) and the scanned code 106 adds a prefix and/or suffice to this predefined URL, such as, http://cookieXYZ/foodproductinformation or http://foodproductinformation/cookieXYZ.

Figure 6:
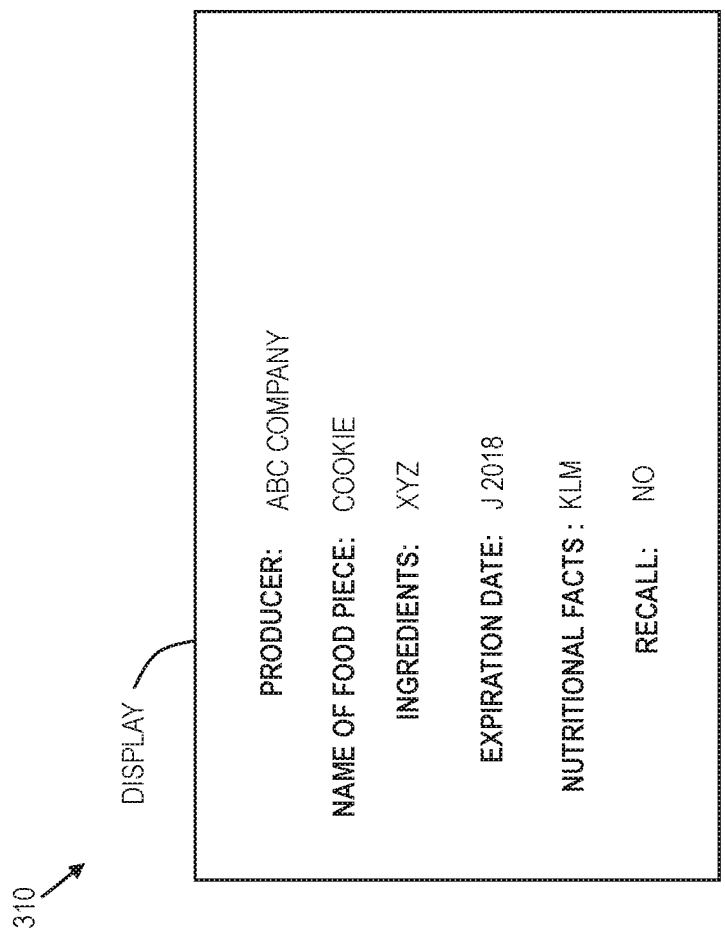
FIG. 6 depicts product information displayed on the device in response to scanning the printed code according to embodiments of the invention.

At block 410, the computer system 104 is configured to recognize the coding associated with printed code 106 and retrieve product information from the food product database 132 mapped to or corresponding to the coding and/or printed code 106. At block 412, the mobile application 302 is configured to output the product information on the device 310 to the consumer/user. The mobile application 302 can read aloud the product information and/or display product information. As an example of displaying the product information for the code 106 of food piece 116, FIG. 6 depicts example product information displayed on the device 310 after scanning the printed code 106 according to embodiments of the invention. For illustration purposes, the device 310 can include the food producer, name of the food piece 116, ingredients of the food piece 116, expiration date of the food piece 116, nutritional facts of the food piece 116, recall data (yes or no), etc. Although example product information is shown in FIG. 6, it should be appreciated that more or less information can be included.

Figure 5:
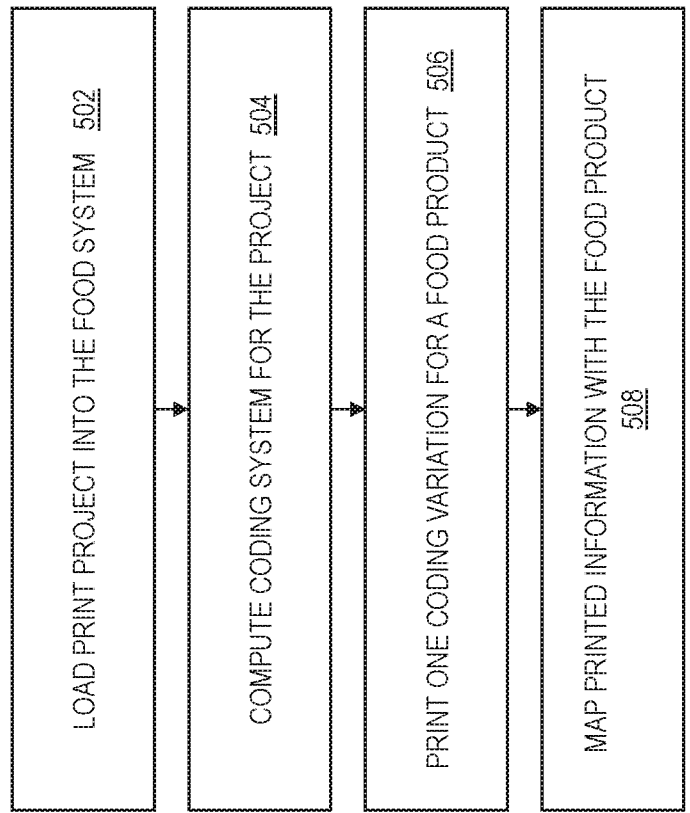
FIG. 5 depicts a flowchart of printing and/or finishing food pieces with printed codes according to embodiments.

FIG. 5 depicts a flowchart 500 of printing and/or finishing food pieces 116 with printed codes 106 according to embodiments. At block 502, the food producer of the food manufacturing/finishing system 102 loads a print project into the printing system 108. For example, the food producer loads a printing project file 114 (e.g., CAD) to be used for producing/finishing the food piece 116, and/or the printing system 108 receives the file 114 from another computer (such as the computer system 104).

At block 504, the computer 140 and/or the computer system 104 are configured to compute the coding system for the project. The coding system consists of developing project details such that the printed codes 106 are not perceptible to the human eye, but, in turn, allow cameras of mobile devices (e.g., on the device 310) to identify the differences. The coding system can includes formats or templates that should be reproduced in the food pieces 116 being produced, and these formats/templates are reproduced as the printed codes 106. Each template (i.e., physical structure of the printed code 106) is associated with (i.e., mapped in map file 152) an image, which can be recognized by image processing algorithms deployed on smartphones (e.g., on the device 310). Additionally, each template is also associated (i.e., mapped in map file 152) with all relevant information one wishes to provide about that particular food piece 116 (e.g., time and location of production, origin of the raw material, ingredients, expiration date, recall data, etc.).

Templates can be associated with individual items and/or with production batches (e.g., in the map file 152), depending on technical feasibility and practical/economical relevance of the information. The definition of templates depends on what is being produced. For instance, in the case of wafers (i.e., crackers) as the food piece 116, to define the template that will be printed as the code 106, one can modify the thickness of the lines, change the color of the wafer, add elements that will yield heterogeneity in their appearance, etc. Given the space of possible choices, any selection procedure (e.g., random generation) can be employed.

In scenarios where templates can be inserted in small regions of the product (i.e., the food piece 116), the same template can be presented in several parts of the product (food piece 116). As such, embodiments of the invention extend the tracking capabilities of a food piece 116 by allowing for the tracking of information even in scenarios where the food piece 116 has been partially fragmented.

At block 506, the food printing system 108 is configured to print one coding variation (i.e., printed code 106) for a particular food piece 116. Once the coding system is generated by the computer 140 and/or computer system 104, then the printing can be performed for the food pieces 116 that are receiving the printed code 106. At this point, the food printing system 108 prints and/or produces food pieces 116 that follow the template previously determined. For example, in some cases, the food printing system 108 prints the code 106 on existing food pieces 116. In some cases, the food printing system 108 prints both the food pieces 116 and their code 106.

At block 508, the computer system 104 maps (via map file 152) printed information (i.e., the printed code 106) with the food product (i.e., the food pieces 116). For example, the computer system 104 registers a generated code with a produced food piece, for example, in map file 152 of the food product database 132. For example, each food unit is mapped to a code, each code is represented by a marker, and each code is mapped to a URL containing information about the food unit. As discussed above, the system can print one or more instances of the same marker to a single food unit. Depending on the application, all food units inside a package can contain the same code/marker (e.g., for consulting nutritional information) or different food units inside the same package can contain different codes/markers (e.g., for consulting the different flavors of a chocolate gift box). Because markers such as QR Codes are able to encode a very high number of different codes, there is no concern of running out of codes. This will allow consumers/users to track food pieces 116 as discussed herein.

As discussed herein, the food product database 132 contains information about food products (i.e., food pieces 116). The food product database 132 is the repository for registering the code printed on the product and contains the associated information. The printed information (i.e., printed code 106) can be seen as a primary key in this database 132. Accordingly, as the consumer/user using his/her device 310 to track the food piece 116, this database 132 is queried and the requested information is retrieved from the database 132 to be presented on the device 310.

There can be various examples of the printed code 106 on food pieces 116. FIG. 10 depicts an example of printed codes 106 on food pieces 116 according to embodiments of the invention. FIG. 10 illustrates a printed layer over, for example, a chocolate bar, where the printed code 106 is made of the lines which include the length of the lines, the width of the lines, the angles of the lines, the spacing between the lines, and the number of the lines. This layout of the printed code 106 is imperceptible to the human eye, which means that the coding associated with the printed code is undiscernible by a human viewing the printed code on the food piece 116. Instead, the device 310 is utilized to scan and discern the layout of the printed code 106. The lines of the printed code 106 are formed of the same material as the chocolate bar (i.e., the food piece), and the lines can be chocolate, vanilla, sugar, and/or any edible ingredients. It should be recognized that the pattern of the printed code 106 repeats, and therefore, the device 310 is configured to read the printed code 106 from a fragment of the chocolate bar.

Figure 11A:
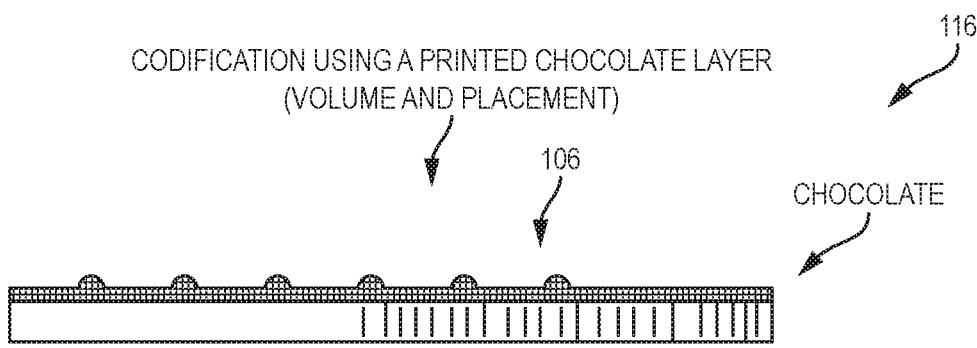
FIG. 11A depicts a side view as an example of printed codes on food pieces according to embodiments of the invention.
Figure 11B:
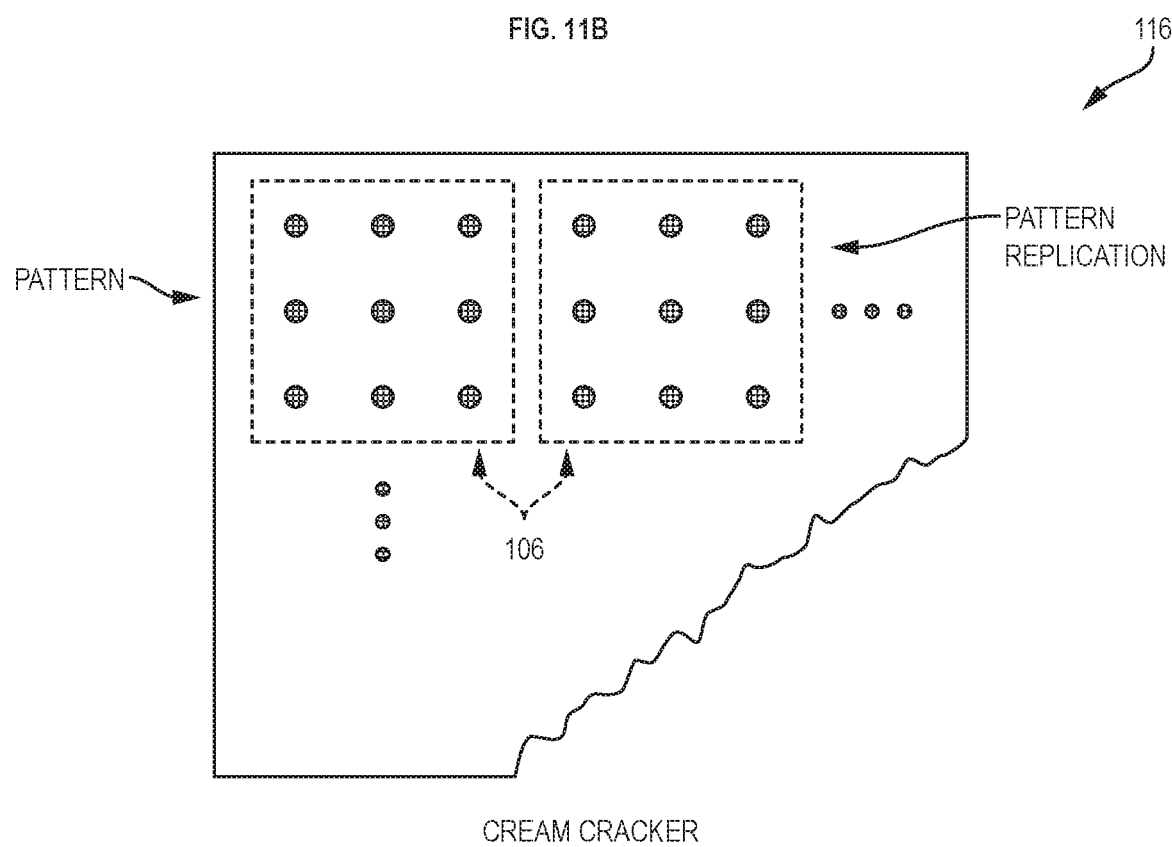
FIG. 11B depicts a top view of the printed codes on the food pieces in FIG. 11A according to embodiments of the invention.

FIG. 11A depicts a side view as an example of printed codes 106 on food pieces 116 according to embodiments of the invention. FIG. 11B depicts a top view of the printed codes 106 on the food pieces 116 in FIG. 11A according to embodiments of the invention. FIG. 11B is a simplified version which omits some details so as not to obscure the figure. FIGS. 11A and 11B represent a printed layer over, for example, a cream cracker, wherein the printed code 106 is the volume/size of the chocolate drops (i.e., circles) and the placement of the chocolate drops. Some chocolate drops are intentionally larger in volume than other chocolate drops (e.g., different diameter, thickness, etc. thereby having a different volume). Again, this layout of the printed code 106 is imperceptible to the human eye, which means that the coding associated with the printed code 106 is undiscernible by a human viewing the printed code on the food piece 116. Instead, the device 310 is utilized to scan and discern the layout of the printed code 106. The volume of the chocolate drops and the placement of the chocolate drops of the printed code 106 are formed of the same material as the cream cracker (i.e., the food piece), and in some implementations the drops can be chocolate, vanilla, sugar, and/or any edible ingredients. It should be recognized that the pattern of the printed code 106 repeats, and therefore, the device 310 is configured to read the printed code 106 from a fragment of the cream cracker.

Figure 12:
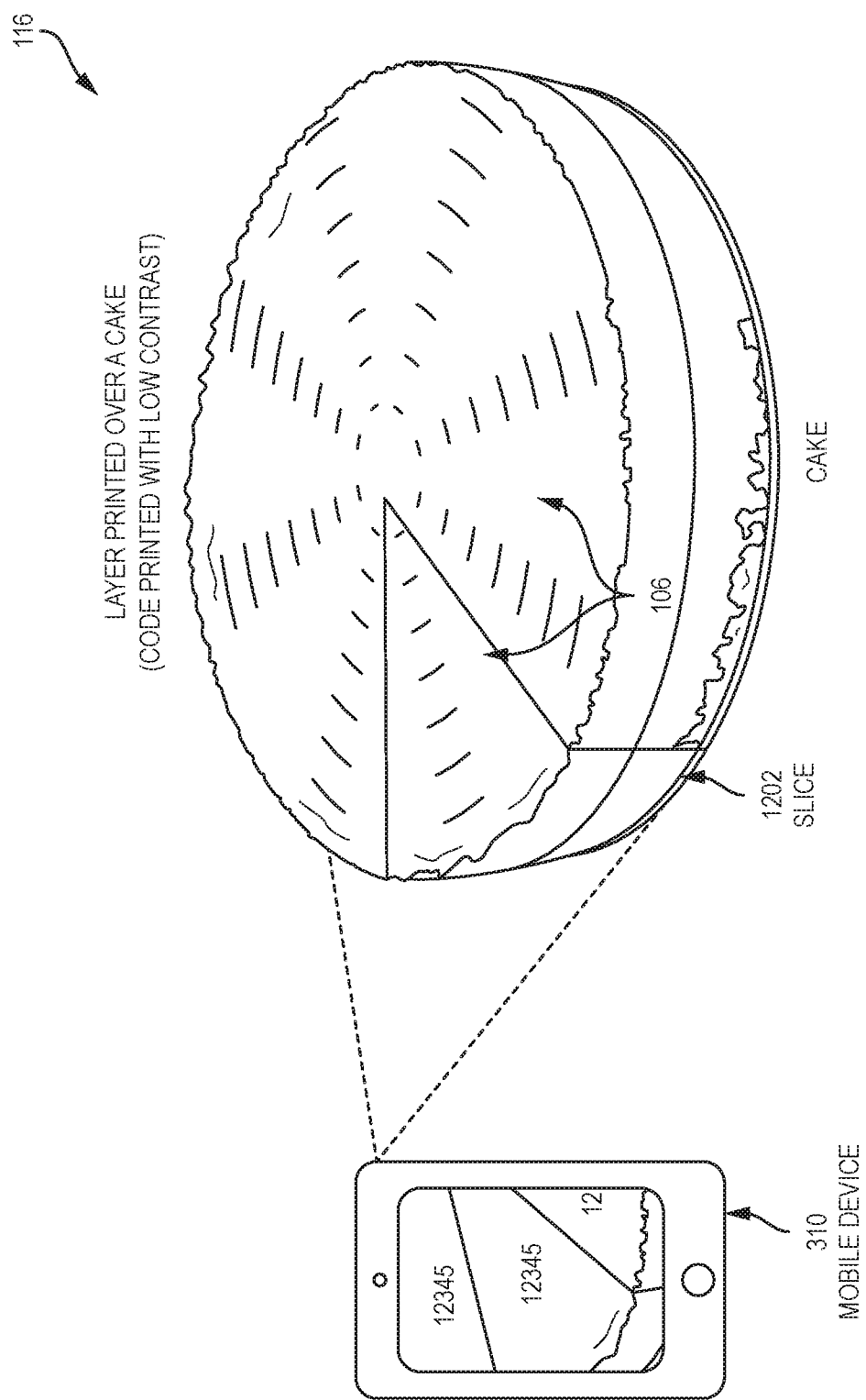
FIG. 12 depicts an example of printed codes on food pieces according to embodiments of the invention.

FIG. 12 depicts an example of printed codes 106 on food pieces 116 according to embodiments of the invention. FIG. 12 illustrates a printed layer over, for example, a cake, where the printed code 106 appears to be made of low contrast lines/shapes. However, the printed code 106 can include characters such as numbers, alphabets, symbols, etc., which can only be seen by an imaging device, such as device 310. This layout of the printed code 106 is imperceptible to the human eye, which means that the coding associated with the printed code 106 is undiscernible by a human viewing the printed code 106 on the food piece 116. Instead, the device 310 is utilized to scan and discern the layout of the printed code 106. The lines (which are actually characters) of the printed code 106 are formed of the same material as the cake (i.e., the food piece), and the lines can be chocolate, vanilla, sugar, and/or any edible ingredients. It should be recognized that the pattern of the printed code 106 repeats, and therefore, the device 310 is configured to read the printed code 106 from a fragment (such as a slice 1202) of the cake.

Figure 13:
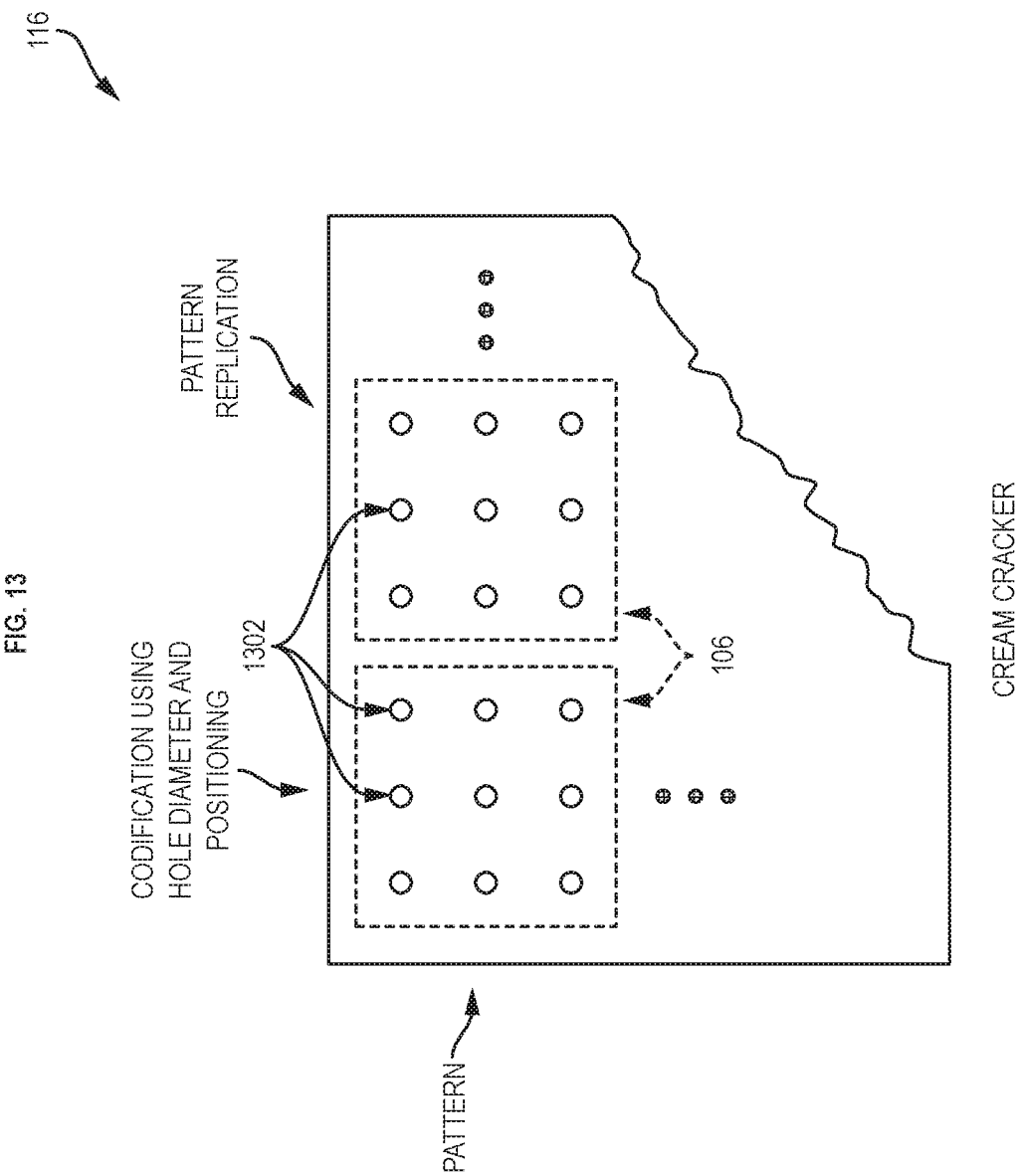
FIG. 13 depicts an example of printed codes on food pieces according to embodiments of the invention.

FIG. 13 depicts an example of printed codes 106 on food pieces 116 according to embodiments of the invention. FIG. 13 represents a codification using holes 1302 on, for example, a cream cracker, where the printed code 106 is the hole diameter and positioning on the cream cracker. The holes 1302 can be made by the food printing system 108, and the food printing system 108 can be equipped with various size nozzles 110 (or sculpting tools) for forming the desired hole diameter. Although a single nozzle 110 is shown for illustration purposes in FIG. 1, there can be multiple nozzles 110 (or sculpting tools) present. Some holes 1302 intentionally diameters than other holes (which can be different shapes). Again, this layout of the printed code 106 is imperceptible to the human eye, which means that the coding associated with the printed code 106 is undiscernible by a human viewing the printed code on the food piece 116. Instead, the device 310 is utilized to scan and discern the layout of the printed code 106. The diameter of the holes 1302 and the placement of the holes 1302 of the printed code 106 are formed of and/or in the same material as the cream cracker (i.e., the food piece). It should be recognized that the pattern of the printed code 106 repeats, and therefore, the device 310 is configured to read the printed code 106 from a fragment of the cream cracker.

Figure 14:
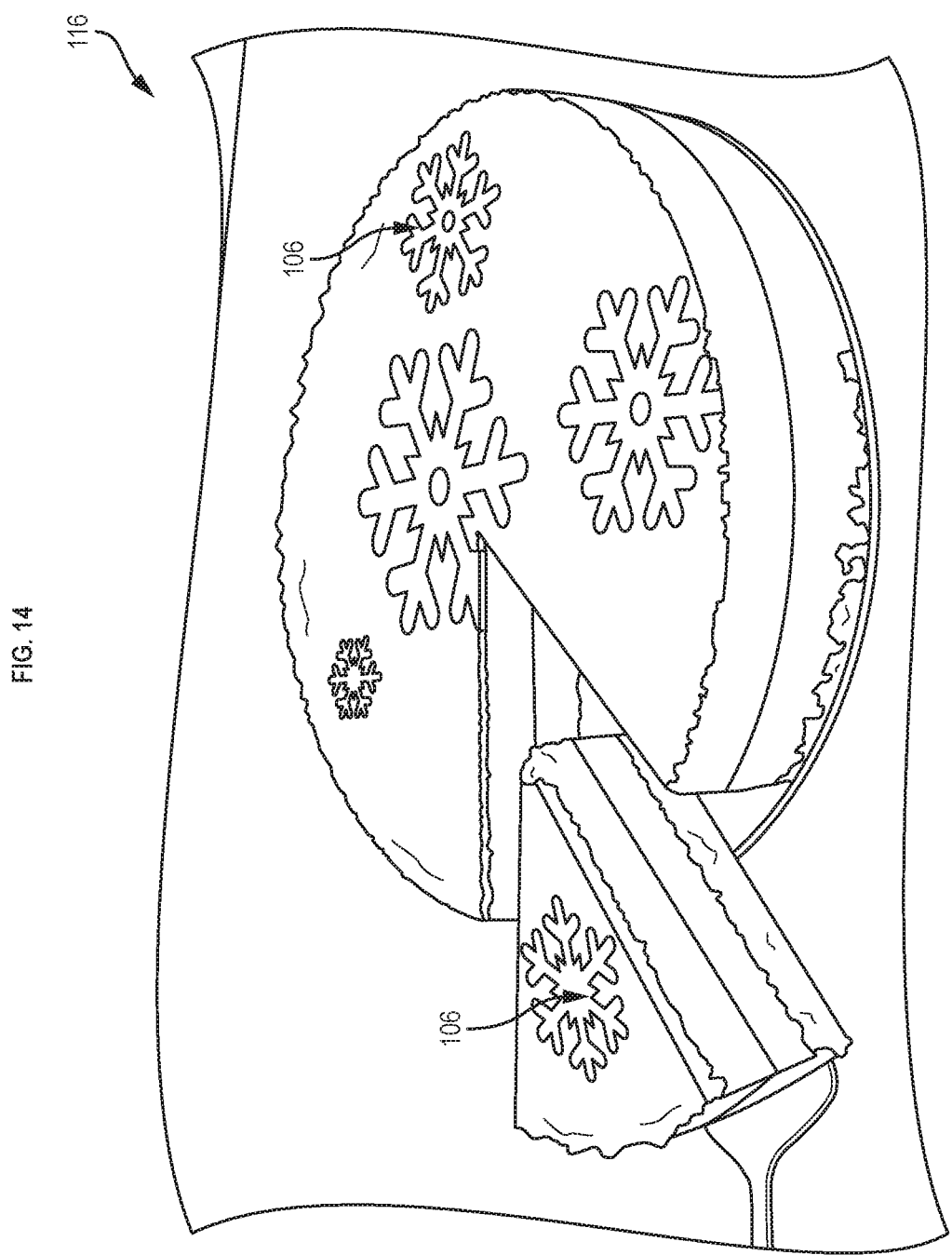
FIG. 14 depicts an example of printed codes on food pieces according to embodiments of the invention.

FIG. 14 depicts an example of printed codes 106 on food pieces 116 according to embodiments of the invention. FIG. 14 illustrates a pattern formed in, for example, a cake, where the printed code 106 appears to simply be a decorative shape. However, the printed code 106 is a unique coding and this layout of the printed code 106 is imperceptible to the human eye, which means that the coding associated with the printed code 106 is undiscernible by a human viewing the printed code 106 on the food piece 116. Instead, the device 310 is utilized to scan and discern the layout of the printed code 106. The shapes (e.g., a snowflake) of the printed code 106 are formed of the same material as the cake (i.e., the food piece), and the shape can be chocolate, vanilla, sugar, and/or any edible ingredients. It should be recognized that the pattern of the printed code 106 repeats, and therefore, the device 310 is configured to read the printed code 106 from a fragment (such as a slice 1202) of the cake.

Figure 7:
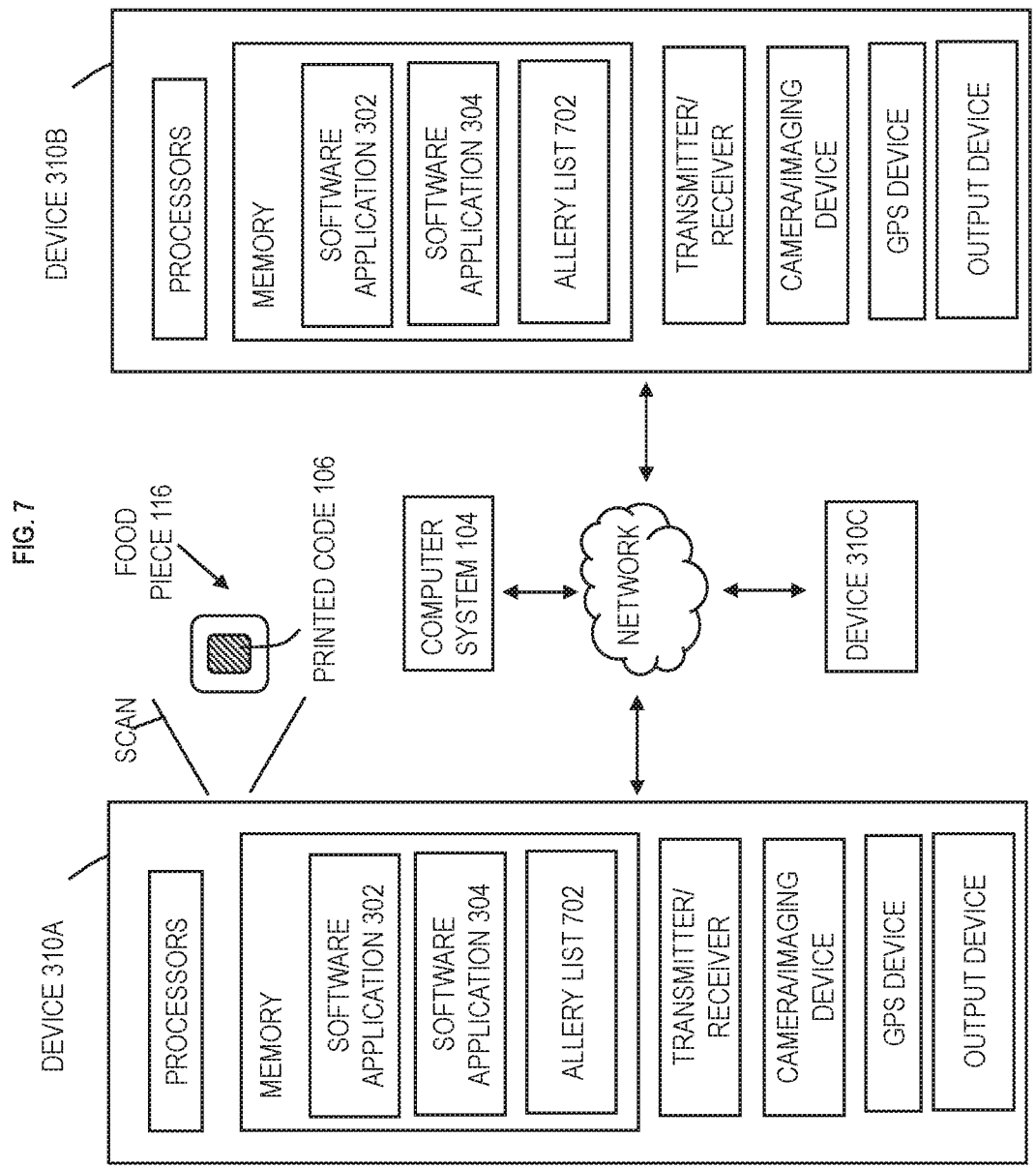
FIG. 7 depicts a diagram of tracking a food piece according to embodiments of the invention.

Use of the printed code 106 can not only benefit the owner of the device 310 who scans the food piece 116 for the printed code 106, but can benefit others who have not scanned the food piece 116. FIG. 7 depicts a block diagram of tracking a food piece 116 according to embodiments of the invention. FIG. 3 only illustrates a single consumer/user device 310. However, FIG. 7 shows many different user devices 310A (for one consumer/user), 310B (for another consumer/user), and 310C (for yet another consumer/user). The details of device 310C are not shown for conciseness but applies by analogy to devices 310A and 310B.

Just as discussed above, the device 310A scans or captures an image of the food piece 116 via the camera/imaging device. The software application 302 is configured to identify the coding of the food piece 116, for example, by identifying the printed code 106 on the food piece 116. The software application 302 can use an image of food piece 116, an image analysis of the printed code 106, and/or the coding associated with the printed code 106 to query the food product database 132. The software application 302 is configured to retrieve the product information of the food piece 116 from the food product database 132 in computer system 104. The consumer/user of the device 310A has a predefined allergy list 702 which is related to health conditions of the consumer/user of device 310A. The software application 302 is configured to check the allergy list 702 against the retrieved ingredients of the food piece 116. When the software application 302 determines a match between one or more items on the allergy list 702 and one or more ingredients in the product information of the food piece 116, the software application 302 is configured to cause an output device (e.g., speaker, light source, display screen, vibration device, etc.) of the device 310A to alert the consumer/user of the device 310A that scanned the food piece 116. The alert on the output device can include sounding an alarm (e.g., in a predefined repetition), flashing a lighting sequence, vibrating repeatedly or in a predefined pattern, and/or any combination of the same, and the alert continues until the consumer/user selects an acknowledgment button on the device 310A. Accordingly, the consumer/user of the device 310A has been alerted about the food allergy and/or potential food allergy to the ingredients of the food piece 116 prior to eating the food piece 116 because of tracking the food piece 116. Additionally, the alert can also occur when the food piece 116 is expired, on recall, etc., and the alert is not limited to matching the ingredients to the allergy list 702.

Additionally, the devices 310A, 310B, and 310C are in the same location, for example, within a predefined proximity (a predetermined number of meters, such as within 5 meters, within 10 meters, within 20 meters, within 50 meters, within 100 meters) as determined by the software application 302 on each respective device using their respective GPS devices. Also, the software application 302 can check a navigation application and/or GPS device of the devices 310A, 310B, and 310C and determine that they are going to the same location or have arrived at the same location, based on permissions being given. For example, the respective consumers of device 310A, 310B, and 310C can be at the same event or gathering. Even though the devices 310B and 310C have not scanned the food piece 116 at the event, the software application 302 on device 310A is configured to transmit the product information of food piece 116 to the software application 302 on device 310B and 310C and/or cause the software application 302 on devices 310B and 310C to retrieve the product information from the computer system 104. Accordingly, the software application 302 on the devices 310B and 310C can compare the product information to the respective allergy lists of device 310B and 310C, and when a match occurs, the respective software applications 302 cause alerts on the respective devices 310B and 310C.

Further, the consumers/users of devices 310A, 310B, and 310C can be family members, trusted friends, etc. In such a case, the consumers/users of devices 310A, 310B, and 310C can agree to share allergy information and be predesignated with sharing permissions by the software application 302 of the respective devices 310A, 310B, and 310C. Each of the devices 310A, 310B, and 310C includes the allergy list 702 of its own consumer/user, along with the allergy list 702 of the other consumers/user. Accordingly, when the device 310A scans the food piece 116 and software application 302 performs the comparison between the product information of the food piece 116 and the allergy list 702, the software application 302 on device 310A also compares the allergy lists having predesignated permissions. When the software application 302 on device 310A finds a match to any of the allergy lists 702 associated with device 310B and 310C, the software application 302 on device 310A is configured to cause the alerts on the devices 310B and 310C, even though the devices 310B and 310C never scanned the food piece 116.

Figure 8:
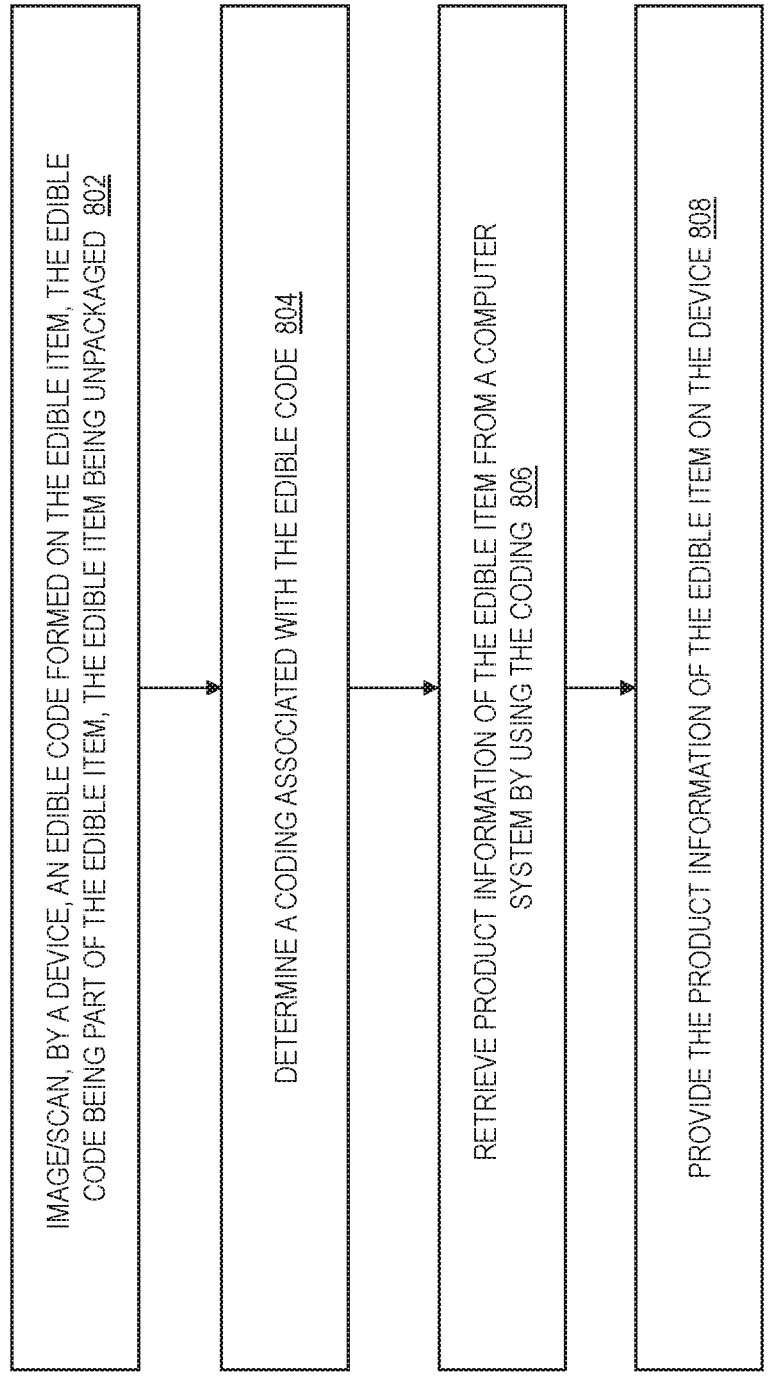
FIG. 8 depicts a flowchart of a computer-implemented method for tracking a foodstuff according to embodiments of the invention.

FIG. 8 depicts a flowchart 800 of a computer-implemented method for tracking a foodstuff such as the food piece 116 according to embodiments of the invention. Foodstuff is a substance with food value to be eaten by a human or animal (e.g., a cat, dog, cattle, etc.). Also, foodstuff is a substance used or capable of being used as nutriment. Although foodstuff can be wrapped in a package (e.g., plastic or paper), housed in a box, and/or placed in a container, the foodstuff is defined as the food content inside the package, box, and/or container. At block 802, the device 310 is configured to scan an edible code (e.g., printed code 106) formed on the foodstuff, the edible code being part of the foodstuff, the foodstuff being unpackaged. At block 804, the device 310 is configured to determine a coding associated with the edible code. At block 806, the device 310 is configured to retrieve product information (e.g., in the food product database 132) of the foodstuff from a computer system by using the coding. A block 808, the device 310 is configured to provide the product information of the foodstuff on the device 310.

The edible code 106 is associated in advance with the coding, such that the software application 302 matches the image of the edible code 106 to the coding. The software application 302 can store the coding along with other codings for other food product. The coding is used to obtain the product information of the foodstuff 116 from various product information (e.g., in the product database 132) associated with various (other) foodstuff.

The edible code 106 includes edible material of the foodstuff 116. The edible code 106 includes one or more grooves in the foodstuff. The edible code 106 includes an edible layer of material. The edible code 106 is printed. The foodstuff 116 is printed. The edible code 106 is humanly imperceptible by the eye as being associated with the coding related to the foodstuff. The edible code 106 is humanly imperceptible as being associated with the product information of the foodstuff 116. The coding is selected from the group consisting of alphanumeric characters, a number, and a Uniform Resource Locator.

Figure 9:
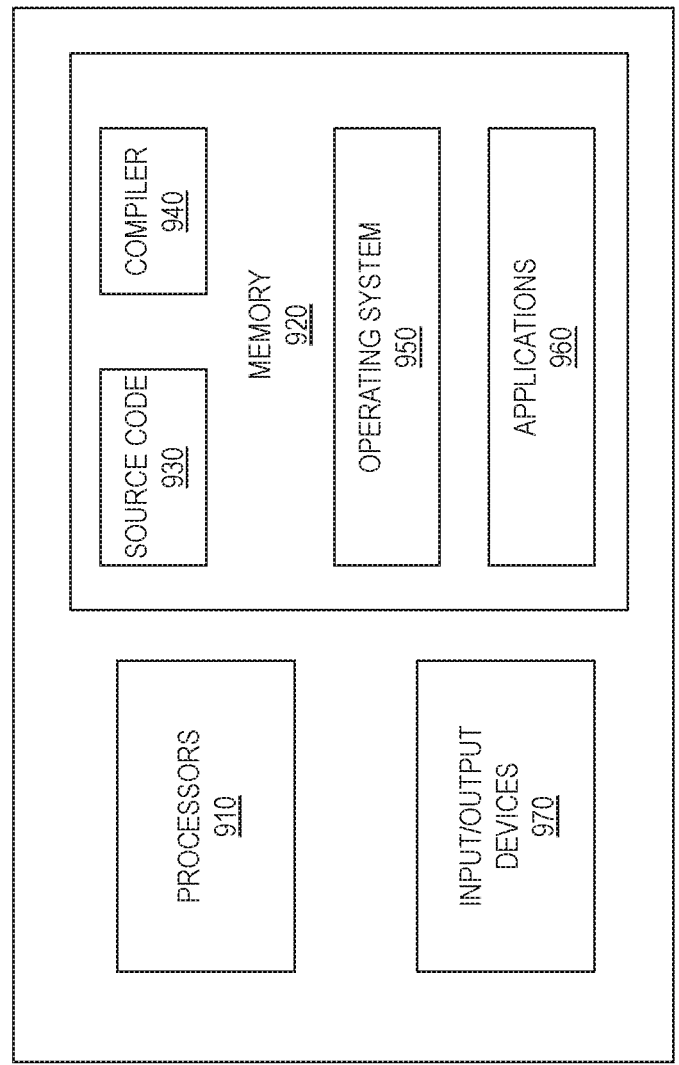
FIG. 9 depicts a computer having functions and operations which can be utilized according to embodiments of the invention.

FIG. 9 illustrates an example of a computer 900 which can be utilized in any aspects as discussed herein according to embodiments of the invention. Various operations and configurations discussed above can utilize the capabilities of the computer 900. For example, one or more of the capabilities of the computer 900 can be incorporated in any element, module, application, component, device, computer, computer system, system, sensors, etc., to operate and functions as discussed herein for FIGS. 1-8 and 10-14.

The computer 900 includes, but is not limited to, PCs, workstations, laptops, PDAs, palm devices, servers, storages, mainframes, and the like. Generally, in terms of hardware architecture, the computer 900 can include one or more processors 910, memory 920, and one or more I/O devices 970 that are communicatively coupled via a local interface (not shown). The local interface can be, for example, but not limited to, one or more buses or other wired or wireless connections, as is known in the art. The local interface can have additional elements, such as controllers, buffers (caches), drivers, repeaters, and receivers, to enable communications. Further, the local interface can include address, control, and/or data connections to enable appropriate communications among the aforementioned components.

The processor 910 is a hardware device for executing software that can be stored in the memory 920. The processor 910 can be virtually any custom made or commercially available processor, a central processing unit (CPU), a digital signal processor (DSP), or an auxiliary processor among several processors associated with the computer 900, and the processor 910 can be a semiconductor based microprocessor (in the form of a microchip) or a macroprocessor. The memory 920 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 920 can incorporate electronic, magnetic, optical, and/or other types of storage media. Note that the memory 920 can have a distributed architecture, where various components are situated remote from one another but can be accessed by the processor 910.

The software in the memory 920 can include one or more separate programs, each of which comprises an ordered listing of executable-instructions for implementing logical functions. The software in the memory 920 includes a suitable operating system (O/S) 950, compiler 990, source code 930, and one or more applications 960 in accordance with embodiments of the invention. As illustrated, the application 960 comprises numerous functional components for implementing the features and operations discussed herein. The application 960 of the computer 900 can represent various applications, computational units, logic, functional units, processes, operations, virtual entities, and/or modules in accordance with embodiments of the invention, but the application 960 is not meant to be a limitation.

The operating system 950 controls the execution of other computer programs, and provides scheduling, input-output control, file and data management, memory management, and communication control and related services. It is contemplated that the application 960 for implementing embodiments of the invention can be applicable on commercially available operating systems.

Application 960 can be a source program, executable program (object code), script, or any other entity comprising a set of instructions to be performed. When a source program, then the program is usually translated via a compiler (such as the compiler 940), assembler, interpreter, or the like, which might or might not be included within the memory 920, so as to operate properly in connection with the O/S 950. Furthermore, the application 960 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 970 can include input devices such as, for example but not limited to, a mouse, keyboard, scanner, microphone, camera, touch screen, joystick, etc. Furthermore, the I/O devices 970 can also include output devices, for example but not limited to storage devices, printers, display, etc. Finally, the I/O devices 970 can further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 970 also include components for communicating over various networks, such as the Internet or intranet.

If the computer 900 is a PC, workstation, intelligent device or the like, the software in the memory 920 can further include a basic input output system (BIOS) (omitted for simplicity). The BIOS is a set of essential software routines that initialize and test hardware at startup, start the O/S 950, and support the transfer of data among the hardware devices. The BIOS is stored in some type of read-only-memory, such as ROM, PROM, EPROM, EEPROM or the like, so that the BIOS can be executed when the computer 900 is activated.

When the computer 900 is in operation, the processor 910 is configured to execute software stored within the memory 920, to communicate data to and from the memory 920, and to generally control operations of the computer 900 pursuant to the software. The application 960 and the O/S 950 are read, in whole or in part, by the processor 910, perhaps buffered within the processor 910, and then executed.

When the application 960 is implemented in software it should be noted that the application 960 can be stored on virtually any computer readable storage medium for use by or in connection with any computer related system or method. In the context of this document, a computer readable storage medium can be an electronic, magnetic, optical, or other physical device or means that can contain or store a computer program for use by or in connection with a computer related system or method.

The application 960 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium can include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

In embodiments of the invention, where the application 960 is implemented in hardware, the application 960 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for tracking a foodstuff, the method comprising:
   imaging, by a device, an edible code formed on the foodstuff, the edible code being part of the foodstuff, the foodstuff being unpackaged;
   determining a coding associated with the edible code;
   retrieving product information of the foodstuff from a computer system by using the coding;
   providing the product information of the foodstuff on the device, the edible code on the foodstuff having been unpackaged being associated with nutritional information and ingredients of the foodstuff; and
   triggering an alert on the device based on the product information of the foodstuff and a predefined list coupled to the device.

2. The computer-implemented method of claim 1, further comprising causing another alert on another device based at least in part on the product information of the foodstuff, wherein the edible code is associated in advance with the coding.

3. The computer-implemented method of claim 1, wherein the coding is used to obtain the product information of the foodstuff from various product information associated with various foodstuff.

4. The computer-implemented method of claim 1, wherein the alert is associated with a potential food allergy to the foodstuff based on information in the predefined list.

5. The computer-implemented method of claim 1, wherein the edible code comprises one or more grooves in the foodstuff.

6. The computer-implemented method of claim 1, wherein the edible code comprises an edible layer of material.

7. The computer-implemented method of claim 1, wherein the edible code is printed.

8. The computer-implemented method of claim 1, wherein the foodstuff is printed.

9. The computer-implemented method of claim 1, wherein the edible code is humanly imperceptible as being associated with the coding related to the foodstuff.

10. The computer-implemented method of claim 1, wherein the edible code is humanly imperceptible as being associated with the product information of the foodstuff.

11. The computer-implemented method of claim 1, wherein the coding is selected from the group consisting of alphanumeric characters, a number, and a Uniform Resource Locator.

12. A system for tracking a foodstuff, the system comprising:
   a processor; and
   memory communicatively coupled to the processor, the memory comprising computer-executable instructions that, when executed by the processor, cause the processor to perform a method comprising:
      imaging, by the processor, an edible code formed on the foodstuff, the edible code being part of the foodstuff, the foodstuff being unpackaged;
      determining a coding associated with the edible code;
      retrieving product information of the foodstuff from a computer system by using the coding;
      providing the product information of the foodstuff, the edible code on the foodstuff having been unpackaged being associated with nutritional information and ingredients of the foodstuff; and
      triggering an alert on the device based on the product information of the foodstuff and a predefined list coupled to the device.

13. The system of claim 12, wherein the edible code is associated in advance with the coding.

14. The system of claim 12, wherein the coding is used to obtain the product information of the foodstuff from various product information associated with various foodstuff.

15. The system of claim 12, wherein the edible code comprises material of the foodstuff.

16. The system of claim 12, wherein the edible code comprises one or more grooves in the foodstuff.

17. The system of claim 12, wherein the edible code comprises an edible layer of material.

18. The system of claim 12, wherein the edible code is printed.

19. A computer program product for tracking a foodstuff, the computer program product comprising a computer readable storage medium having program instructions embodied therewith, wherein the computer readable storage medium is not a transitory signal per se, the program instructions executable by a computer to cause the computer to perform a method comprising:
   imaging, by the computer, an edible code formed on the foodstuff, the edible code being part of the foodstuff, the foodstuff being unpackaged;
   determining a coding associated with the edible code;
   retrieving product information of the foodstuff from a computer system by using the coding;
   providing the product information of the foodstuff on the computer, the edible code on the foodstuff having been unpackaged being associated with nutritional information and ingredients of the foodstuff; and
   triggering an alert on the device based on the product information of the foodstuff and a predefined list coupled to the device.

20. The computer program product of claim 19, wherein the edible code is associated in advance with the coding.

* * * * *